(12) United States Patent
Li et al.

(10) Patent No.: US 11,364,568 B2
(45) Date of Patent: Jun. 21, 2022

(54) JOINING OF FERROUS ALLOY COMPONENTS BY FUSION WELDING USING A LOW CARBON STEEL INTERMEDIATE ELEMENT

(71) Applicant: GM Global Technology Operations LLC, Detroit, MI (US)

(72) Inventors: Huaxin Li, Rochester Hills, MI (US); Liang Wang, Rochester Hills, MI (US); Dale A Gerard, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 111 days.

(21) Appl. No.: 16/684,055

(22) Filed: Nov. 14, 2019

(65) Prior Publication Data
US 2021/0146479 A1    May 20, 2021

(51) Int. Cl.
| | |
|---|---|
| *B23K 26/244* | (2014.01) |
| *B23K 26/00* | (2014.01) |
| *B23K 35/30* | (2006.01) |
| *B22D 19/04* | (2006.01) |
| *F16H 57/02* | (2012.01) |

(Continued)

(52) U.S. Cl.
CPC ........ *B23K 26/244* (2015.10); *B22D 19/0036* (2013.01); *B22D 19/04* (2013.01); *B23K 26/0006* (2013.01); *B23K 26/0093* (2013.01); *B23K 35/306* (2013.01); *F16H 57/02* (2013.01);

(Continued)

(58) Field of Classification Search
CPC .. B23K 2103/02; B23K 26/242; B23K 26/32; B23K 2101/008; B23K 2103/06; B23K 26/24; B23K 26/28; B23K 33/004; B23K 26/244; B23K 26/0006; B23K 26/0093; B23K 35/306; F16H 48/38; F16H 57/023; F16H 57/032; F16H 48/40; F16H 57/02; F16H 2057/02017; B22D 19/0036; B22D 19/04

See application file for complete search history.

(56) References Cited

U.S. PATENT DOCUMENTS

2019/0203818 A1*   7/2019  Broker .................... F16H 55/22

OTHER PUBLICATIONS

A439/A439M (Year: 2018).*
U.S. Appl. No. 16/189,273, filed Nov. 13, 2018.

* cited by examiner

*Primary Examiner* — Joel M Attey
*Assistant Examiner* — Adam Michael Eckardt
(74) *Attorney, Agent, or Firm* — Vivacqua Crane PLLC

(57) ABSTRACT

A method of joining two ferrous alloy component parts. The method includes hot metal casting a portion of a first ferrous alloy component part onto a first joining surface of a low carbon intermediate element; friction fitting a joining surface of a second ferrous alloy component part against a second joining surface of the low carbon intermediate element; and fusion welding with a concentrated energy source the intermediate element to the second ferrous alloy component part. The hot metal casting includes flowing a molten ferrous alloy onto the textured first joining surface, wherein the molten ally encompasses tabs extending from the first joining surface and filling apertures defined in the intermediate element. Then cooling the molten ferrous alloy such that a metallurgical and mechanical bond is formed between the portion of the first ferrous alloy component part and the first joining surface of the low carbon intermediate element.

10 Claims, 3 Drawing Sheets

(51) Int. Cl.
   *B22D 19/00* (2006.01)
   *B23K 101/00* (2006.01)
(52) U.S. Cl.
   CPC .................. *B23K 2101/008* (2018.08); *F16H 2057/02017* (2013.01)

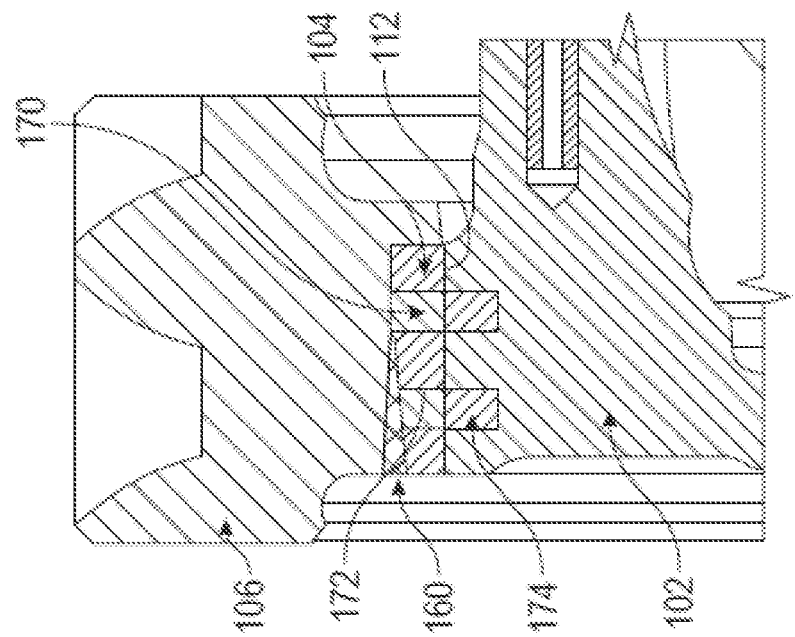
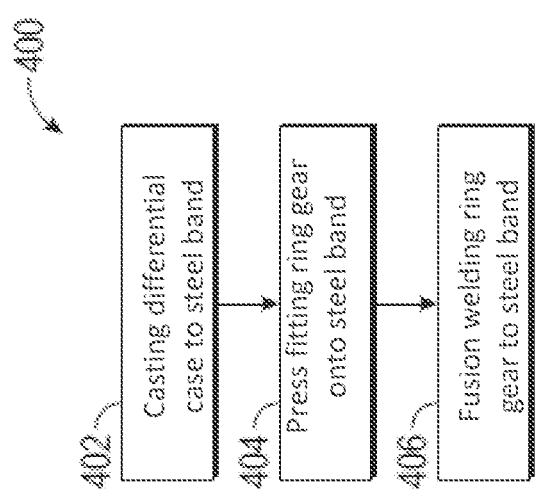

JOINING OF FERROUS ALLOY COMPONENTS BY FUSION WELDING USING A LOW CARBON STEEL INTERMEDIATE ELEMENT

INTRODUCTION

The present disclosure relates to fusion welding of two or more ferrous alloy component parts, in which one of the component parts has a high carbon content not suitable for fusion welding to the other of the component parts.

The manufacture of certain complex automotive components may require the joining of two or more ferrous alloy component parts. Fusion welding operations, such as laser welding, are prefer methods of joining ferrous alloy component parts. However, the carbon content of one of the ferrous alloy parts to be joined may render fusion welding of the parts difficult. As the carbon content or the carbon equivalency of a ferrous alloy increases, the hardness of the alloy increases and, consequently, the weldability of the alloy decreases due to the formation hard and brittle microstructural phases within the fusion zone and the surrounding heat-affected zone when the molten material created during the prescribed welding operation solidifies rapidly. These hard and brittle microstructural phases are more susceptible to various forms of cracking including quench cracking from thermal shock and/or hydrogen induced cold cracking.

Mechanical fasteners such as bolts, rivets, flow drill screws, rivet nuts, and the like are typically used when ferrous alloy parts need to be joined but the weldability of one or both of the parts is not ideal. Compared to fusion welding operations, however, the joining of ferrous alloy parts with mechanical fasteners adds weight to the joined assembly and is more time-consuming and labor intensive.

Thus, while mechanical fasteners for joining ferrous alloy parts achieve their intended purpose, there is a need for the ability to fusion weld ferrous alloy parts when one of the parts has a low-weldability, thus improving the efficiency and economics of a wide variety of manufacturing practices.

SUMMARY

According to several aspects, a method of joining two ferrous alloy component parts is described. The method includes hot metal casting a portion of a first ferrous alloy component part onto a first joining surface of a low carbon intermediate element; friction fitting, such as press fitting, a joining surface of a second ferrous alloy component part against a second joining surface of the low carbon intermediate element; and fusion welding with a concentrated energy source the intermediate element to the second ferrous alloy component part. The first ferrous alloy component part is a differential case, the second ferrous alloy component part is a ring gear, and the intermediate element is a steel band of a differential assembly.

In an additional aspect of the present disclosure, hot metal casting the portion of the first ferrous alloy component part onto the first joining surface of a low carbon intermediate element includes flowing a molten ferrous alloy onto the first joining surface and cooling the molten ferrous alloy in such a way that a mechanical and/or metallurgical bond is formed between the portion of the first ferrous alloy component part and the first joining surface of the low carbon intermediate element.

In another aspect of the present disclosure, the low carbon intermediate element defines at least one aperture extending from the first joining surface to the second joining surface. The hot metal casting the portion of the first ferrous alloy component part onto the first joining surface of the low carbon intermediate element includes flowing the molten ferrous alloy into the at least one aperture.

In another aspect of the present disclosure, the low carbon intermediate element defines at least one tab extending away from the first joining surface. The hot metal casting the portion of the first ferrous alloy component part onto the first joining surface of the low carbon intermediate element includes flowing the molten ferrous alloy onto and encapsulating the at least one tab.

In another aspect of the present disclosure, the first ferrous alloy component part comprises a carbon content of greater than about 0.5%.

In another aspect of the present disclosure, the second ferrous alloy component part comprises an equivalent carbon content of greater than about 0.5%.

In another aspect of the present disclosure, the low carbon intermediate element comprises less than 0.5% weight percent carbon.

In another aspect of the present disclosure, the hot metal casting the portion of the first ferrous alloy component part onto the first joining surface of a low carbon intermediate element includes flowing a molten ferrous alloy onto a textured surface defined on the first joining surface.

In another aspect of the present disclosure, the low carbon intermediate element includes an alloy composition of about 0.01 wt % to 0.4 wt % carbon and a balance of iron.

According to several aspects, a method of joining a differential case and ring gear by using a steel sleeve as an intermediate element is described. The method includes hot metal casting a portion of the differential case onto an inner surface of the steel sleeve including flowing a molten ferrous alloy onto the inner surface of the steel sleeve and cooling the molten ferrous alloy in such a way that a metallurgically bonded joint is formed joining the portion of the differential case and the inner surface of the steel sleeve; press fitting a portion of the ring gear onto an outer surface of the steel sleeve; and fusion welding the ring gear onto the steel sleeve along a peripheral joint seam defined by adjacent portions the ring gear and the outer surface of the steel sleeve.

In an additional aspect of the present disclosure, the steel sleeve defines at least one aperture extending between the inner surface and the outer surface. Hot metal casting a portion of the differential case onto an inner surface of the steel sleeve further includes flowing the molten ferrous alloy into the at least one aperture, thereby interlocking the differential case to the steel sleeve once the molten ferrous alloy is cooled.

In another aspect of the present disclosure, the steel sleeve defines at least one tab extending from the inner surface. Hot metal casting a portion of the differential case onto an inner surface of the steel sleeve further includes flowing the molten ferrous alloy onto the at least one tab, thereby interlocking the differential case to the steel sleeve once the molten ferrous alloy is cooled.

In another aspect of the present disclosure, the inner surface of the steel sleeve includes a textured surface. Hot metal casting a portion of the differential case onto an inner surface of the steel sleeve further includes flowing the molten onto the textured surface.

In another aspect of the present disclosure, the steel sleeve includes an alloy composition of about 0.15 wt % to 0.23 wt % carbon and a balance of iron.

According to several aspects, a differential assembly is described. The differential assembly includes a differential case constructed from a carbon ferrous alloy having greater than 0.5 wt % carbon; a ring gear constructed from a carbon ferrous alloy having less than 0.5 wt % carbon; and a steel sleeve having an alloy composition of about 0.01 wt % to 0.1 wt % carbon and a balance of iron. The steel sleeve incudes an inner surface metallurgically bonded onto a portion of the differential case and an opposite outer surface fusion welded to a portion of the ring gear.

In an additional aspect of the present disclosure, the inner surface of the steel sleeve includes a plurality of tabs extending into the differential case thereby interlocking locking the steel sleeve to the differential case.

In another aspect of the present disclosure, at least one of the tab is bent along a fold edge into the portion of the differential case.

In another aspect of the present disclosure, the steel sleeve includes a plurality of apertures extending between the inner surface and the outer surface. The portion of the differential case is casted into the apertures thereby interlocking the steel sleeve to the differential case.

In another aspect of the present disclosure, the portion of the portion of the differential case metallurgically bonded onto the inner surface of the steel sleeve is a circumferential surface of an integral attachment flange surrounding and projecting radially outwardly from the differential case.

BRIEF DESCRIPTION OF THE DRAWINGS

FIG. 4 is a block diagram of a method of joining the differential case to the ring gear; and FIG. 5 is a diagrammatic cross-sectional view of a portion of the differential assembly across section line 5-5 of FIG. 2, according to one embodiment of the present disclosure.

DETAILED DESCRIPTION

Figure 1:
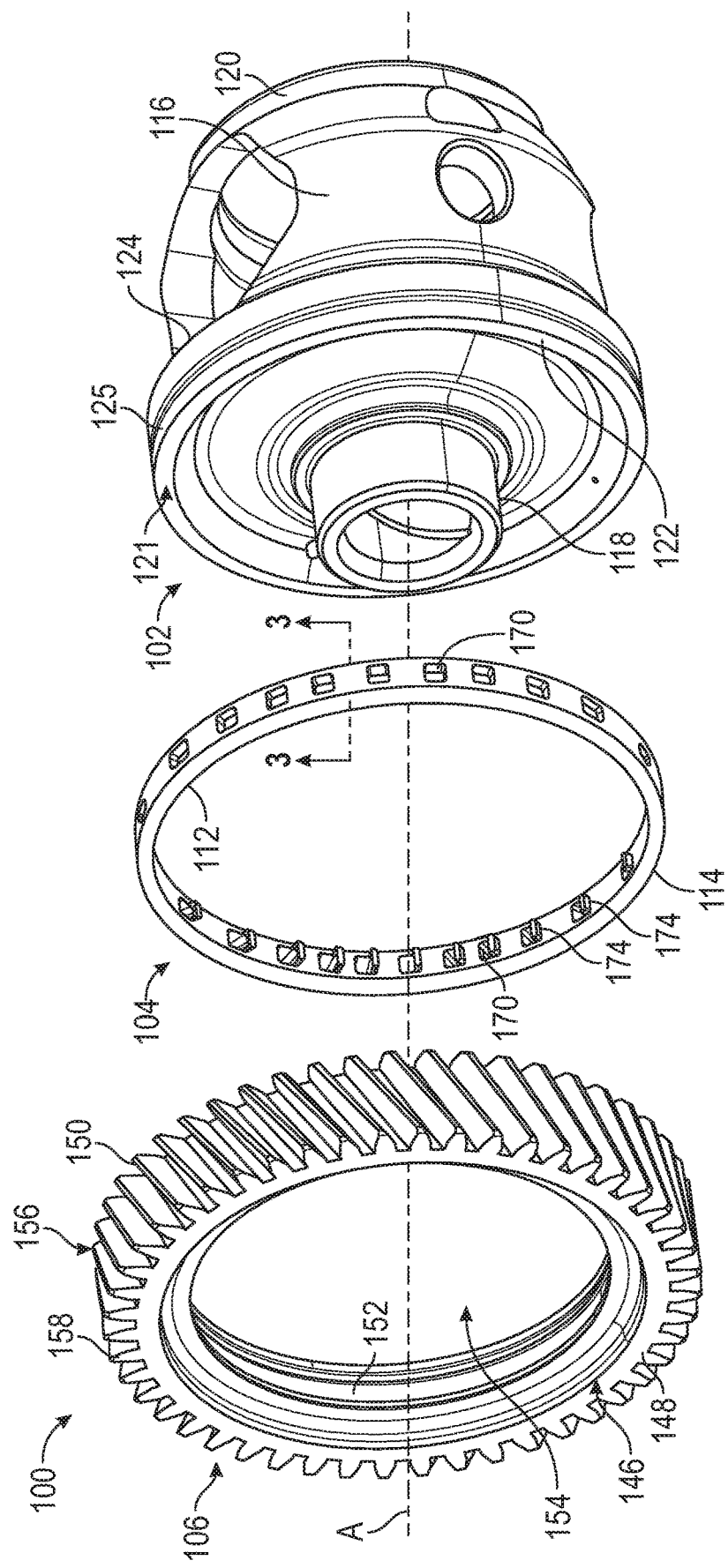
FIG. 1 is an exploded perspective view of a differential assembly having a differential case, a low carbon steel band, and a ring gear, according to one embodiment of the present disclosure.

The following description is merely exemplary in nature and is not intended to limit the present disclosure, application, or uses. The illustrated embodiments are disclosed with reference to the drawings, wherein like numerals indicate like corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

The present disclosure provides a method of joining a first ferrous alloy component part 102 to a second ferrous alloy component part 106 by fusion welding with a concentrated energy source (e.g., a laser beam, an electron beam, etc.) when at least one of the first and second ferrous alloy component parts 102, 106 is considered unweldable because it possesses either a high carbon content or a high carbon equivalency. For purposes of the present disclosure, a carbon content or a carbon equivalency of greater than 0.50 wt % is considered to render a ferrous alloy unweldable. In a non-limiting example, the first ferrous alloy component part 102 may be that of a differential case 102 and the second ferrous alloy component part 106 may be that of a ring gear 106 of a differential assembly 100, details of which are described below.

In the embodiment presented, the first ferrous alloy component part 102 is manufactured of a high carbon ferrous alloy and the second ferrous alloy component part 106 is manufactured of a low carbon ferrous alloy that may have a high carbon content equivalent. The first ferrous alloy component part 102 is joined to the second ferrous alloy component part 106 by first hot metal casting a portion of the first ferrous alloy component part 102 onto a first joining surface 112 of a low carbon intermediate element 104, follow by assembling the first ferrous alloy component part 102 to the second ferrous alloy component part 106 by friction fitting, such as by press fitting, a portion of the second ferrous alloy component part 106 against a second joining surface 114 of the low carbon intermediate element 104, and then fusion welding, preferably with a concentrated energy source such as a laser beam or an electron beam, the intermediate element 104 to the second ferrous alloy component part 106. Exemplary hot metal casting such as die casting, investment casting, plaster casting, sand casting, and lost foam casting.

The low carbon intermediate element 104 includes features, which are described in detail below, that enable the unweldable first ferrous alloy component part 102 to be mechanically joined and metallurgically bonded onto the first joining surface 112 of the intermediate element 104 and enables the second ferrous alloy component part 106 to be fusion welded onto the intermediate element 104, thus joining the first ferrous alloy component part 102 to the second ferrous alloy component part 106 with the low carbon intermediate element 104 therebetween.

Referring to FIG. 1, is an illustrative embodiment of the present disclosure described in the context of a differential assembly 100, although it should be appreciated that the same method can be practiced on other ferrous alloy component parts as well. FIG. 1 shows an exploded view of the components of the differential assembly 100 disposed along an axis of rotation A. The differential assembly 100 includes a differential case 102, a low carbon steel band 104, and a ring gear 106. The differential case 102 and ring gear 106 are exemplary embodiments of the first ferrous alloy component part 102 and the second ferrous alloy component part 106, respectively. The low carbon steel band 104, also referred to as a low carbon steel sleeve 104, is an exemplary embodiment of the intermediate element 104.

The differential case 102 is constructed from a high carbon ferrous alloy and the ring gear 106 is constructed from a low carbon ferrous alloy. The differential case 102 is manufactured by a hot metal casting operation in which a portion the differential case 102 is hot cast and cooled onto an inner circumferential surface 112 of the low carbon steel band 104. The casting operation forms a metallurgical bond between the portion of the differential case 102 and the inner circumferential surface 112 of the low carbon steel band 104. The ring gear 106 is friction fitted onto an outer circumferential surface 114 of the steel band 104. A concentrated energy source such as a laser beam or an electron beam is used to fusion weld the ring gear 106 to an adjacent portion of the steel band 104. The inner and outer circumferential surfaces 112, 114 of the steel band 104 are also referred to as the first joining surface 112 and a second joining surface 114, respectively.

The differential case 102 includes an elongated body 116 that extends along the axis of rotation A from a first hub 118 to an opposite second hub 120. The differential case 102 additionally includes an integral attachment flange 121 that surrounds and projects radially outwardly from the elongated body 116. The attachment flange 121 has an axially facing annular front surface 122, an axially facing annular back surface 124, and a circumferential edge surface 125 that connects the front and back surfaces 122, 124.

The differential case 102 is hot form casted from ductile cast iron having an alloy composition that includes iron as a main alloy constituent along with 3.2 wt % to 3.6 wt % carbon, 2.2 wt % to 2.8 wt % silicon, and one or more nodulizing elements selected from magnesium or cerium. For example, a common alloy composition for ductile iron includes 3.2 wt % to 3.6 wt % carbon, 2.2 wt % to 2.8 wt % silicon, 0.1 wt % to 0.2 wt % manganese, 0.03 wt % to 0.04 wt % magnesium, 0.005 wt % to 0.04 wt % phosphorus, 0.005 wt % to 0.02 wt % sulfur, 0 wt % to 0.40 wt % copper, and the balance iron with industry accepted impurities. Other ductile alloy compositions may include additional elements such as nickel, tin, and/or chromium. Ductile iron has good torsional strength, impact and fatigue resistance, and wear resistance, and its enhanced ductility (compared to grey cast iron) can be attributed to the fact that precipitated carbon takes the shape of spherical graphite nodules that are dispersed within an iron-based matrix that usually includes pearlite and/or ferrite. The spherical graphite nodules are formed as a result of the nodulizing elements, which interact with graphite precipitates and force isotropic growth into spheroids, and when dispersed throughout the iron-based matrix tend to inhibit the creation of cracks in response to stress.

Figure 2:
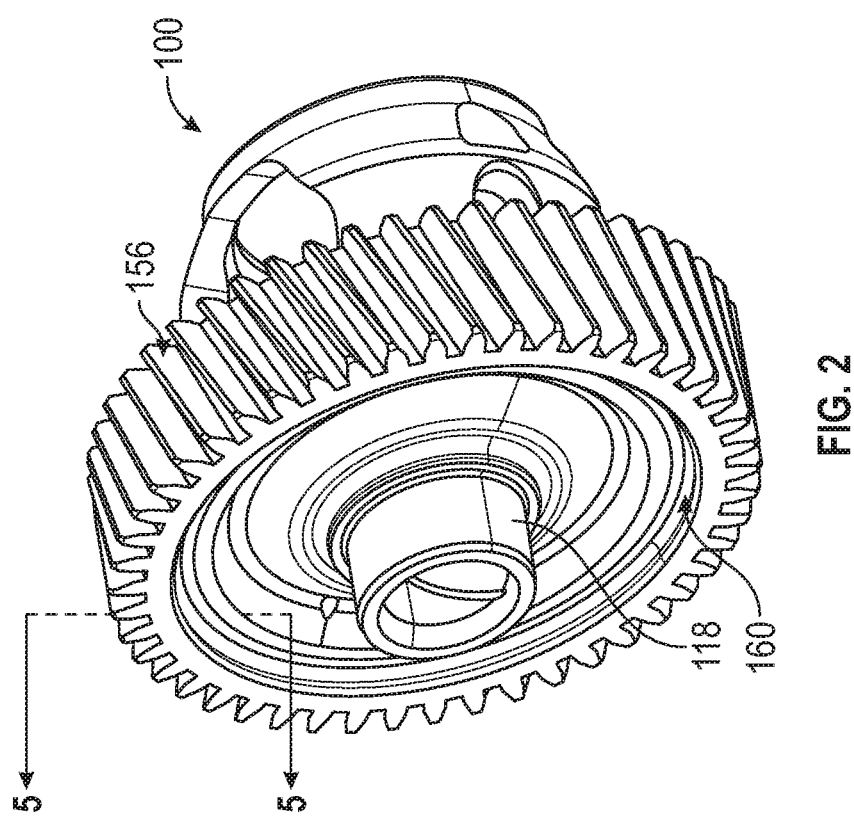
FIG. 2 is a perspective view of the differential assembly of FIG. 1, according to one embodiment of the present disclosure.

The ring gear 106 includes an annular body 146 that has a profiled annular front surface 148, an annular back surface 150, and an inner circumferential surface 152 that connects the front and back surfaces 148, 150 and defines a central opening 154, and an outer circumferential surface 156 that also connects the front and back surfaces 148, 150. The outer circumferential surface 156 defines a plurality of radially-extending gear teeth 158 that are circumferentially spaced around the central opening 154 of the ring gear 106. The gear teeth may be curved (as shown) or straight. The inner circumferential surface 152 of the ring gear 106 is press fitted onto the outer joining surface 114 of the steel band 104. FIG. 2 shows a perspective view of an assembled differential assembly 100 of FIG. 1. Referring to both FIGS. 1 and 2, the outer joining surface 114 of the steel band 104 and an adjacent portion of the inner circumferential surface 152 of the ring gear 106 defines a external peripheral seam 160 (best shown in FIG. 5) at which the ring gear 106 and the steel band 104 are fusion welded.

The ring gear 106 is constructed from case hardened low carbon alloy steel in this particular embodiment. Low carbon alloy steel has an alloy composition that includes iron as a main alloy constituent and up to 4.0 wt % alloying elements including 0.17 wt % to 0.23 wt % carbon plus at least one other non-impurity alloying element. For example, the other non-impurity alloying elements may be manganese, nickel, chromium, and molybdenum (i.e, a nickel-chromium-molybdenum low carbon alloy steel) or chromium and manganese (i.e., a chromium-manganese low carbon alloy steel). In the former steel, the alloy composition may include 0 wt % to 1.85 wt % nickel, 0 wt % to 1.3 wt % chromium, and 0 wt % to 0.4 wt % molybdenum, while in the latter steel the alloy composition may include 0.6 wt % to 1.8 wt % chromium and 0.8 wt % to 2.0 wt % manganese. Several commercially available grades of low carbon alloy steel that are useful in constructing the ring gear 106 include 43xxM, 86xxM, 41xxM, and 51xxM steels. Low carbon alloy steel is suitable for the ring gear 106 because it exhibits good wear and fatigue resistance while also being machinable.

Generally speaking, the differential case 102 and, to a lesser extent, the ring gear 106 are not inherently well-suited for fusion welding. The carbon content of the ductile iron alloy (3.2-3.6 wt %) that constitutes the differential case 102 is significantly greater than 0.5 wt %. Additionally, while the carbon content of the low carbon alloy steel (0.17-0.23 wt %) that constitutes the uncarburized bulk steel portion 68 of the ring gear 106 is not itself overly problematic, the carbon equivalency of the alloy steel is greater than 0.5 wt % due to the presence of the other alloying elements. The carbon equivalency of the low carbon alloy steel is calculated by the following equation:

$$CE = C + \frac{Mn}{6} + \frac{(Cr + Mo + V)}{5} + \frac{(Ni + Cu)}{15}$$

At this carbon content and carbon equivalency of the alloy compositions of the differential case 102 and the ring gear 106, respectively, the hardness of the alloys increases and, consequently, the weldability of the alloys decreases due to martensite formation within the fusion zone and the surrounding heat-affected zone when the molten material created during the prescribed welding operation solidifies rapidly. Martensite microstructures, in turn, are more susceptible to various forms of cracking including quench cracking from thermal shock and/or hydrogen induced cold cracking.

Figure 3:
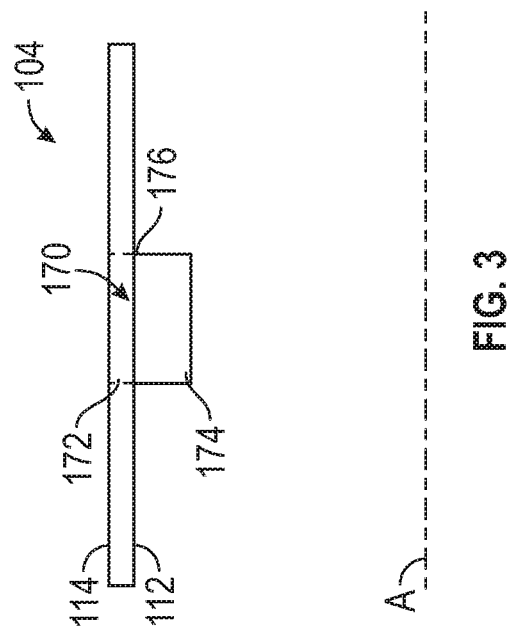
FIG. 3 is diagrammatic cross-sectional view of the low carbon steel band across section line 2-2 of FIG. 1, according to one embodiment of the present disclosure.

FIG. 3 shows a diagrammatic cross-sectional view of the low carbon band 104 across section line 3-3 of FIG. 1. The steel band 104 is used as an intermediate element 104 to join the differential case 102 to the ring gear 106. The steel band 104 includes the inner circumferential surface 112 or first joining surface 112 oriented toward the rotational axis A and the opposite facing outer circumferential surface 114 or second joining surface 114. The steel band 104 defines a plurality of apertures 170 having edge surfaces 172 connecting the inner and outer circumferential surfaces 112, 114. The steel band 104 also includes a plurality of tabs 174 extending from the inner circumferential surface 112 toward the rotational axis A. In the embodiment shown, the plurality of tabs 174 are die cut from the steel band 104 and bent inward along a folded edge 176 toward the axis A, thereby defining the plurality of apertures 170. The inner circumferential surface 112 of the steel band 104 may be textured or roughened by sand or media blasting for improved mechanical and metallurgical bonding with the circumferential edge surface 108 of the attachment flange 121 during the hot metal casting process.

The low carbon steel band 104 has an alloy composition that includes from about 0.15 wt % to about 0.23 wt % carbon and the balance iron. Other alloying elements may be intentionally included in the alloy composition of the low carbon steel but may nonetheless be present in the alloy composition at 2.0 wt % or less in the aggregate. Low carbon alloy steel is ductile and is deemed to have good weldability on account of its low carbon content and low carbon equivalency. The low carbon steel band 104 can thus function as a carbon mediator during welding, as will be discussed in further detail below. In a preferred implementation, as illustrated here. The low carbon steel band 104 has a circumference that may be continuous.

FIG. 4 shows a block diagram of a method 400 of joining the differential case 102 to the ring gear 106. In Block 402, the differential case 102 and the ring gear 106 can be successfully joined by first casting the circumferential edge 108 surface of the attachment flange 121 of the differential case 102 onto the inner surface 112 or first joining surface 112 of the steel band 104 by flowing a molten ferrous alloy onto the inner surface of the steel band 104 and cooling the molten ferrous alloy in such a way that a metallurgically bonded joint is formed once the casting is cooled, thereby joining the circumferential edge surface 108 with the inner surface of the steel band 104. Moving to Block 404, follow by press fitting the inner circumferential surface of the ring gear 106 onto the outer surface 114 or second joining surface 114 of the steel band 104. Moving to Block 406, then fusion welding the ring gear 106 onto the steel band 104 along the peripheral joint seam 160 defined by adjacent portions of the inner circumferential surface 152 of the ring gear 106 and the outer surface 114 or second joining surface 114 of the steel band 104.

FIG. 5 is a diagrammatic cross-sectional view of a portion of the differential case 102 and the ring gear 106 having the low carbon steel band 104 therebetween. During the hot casting process, the molten alloy flows onto the inner cylindrical surface 112 of the steel band 104 encapsulating the tabs 174 and filling the void defined by the apertures 170. The tabs 174, apertures 170, and etched inner cylindrical surface 112 aides in metallurgically and mechanically bonding of the differential case 102 onto the steel band 104. The ring gear 106 is then welded onto the outer adjacent circumferential edge surface of the steel band 104, thus effectively joining the differential case 102 to the ring gear 106 with the steel band 104 therebetween.

In preparation for welding, the differential case 102 and ring gear 106 are brought together. This involves sliding the ring gear 106 relative to the differential case 102 so that the ring gear 106 moves past the first axle hub 118 and over the elongated annular body 116 of the casing 102. As shown best in FIG. 1, the ring gear 106 is positioned so that the inner circumferential surface 152 of the ring gear 106 is friction fitted onto outer surface 114 of the steel band 104.

Preferably, the ring gear 106 and the steel band 104 are welded together using a laser beam without adjusting the composition of the laser weld joint by introducing foreign metal into the joint via a filler wire. A concentrated energy source is directed towards and impinges the edge surface of the steel band 104 and the adjacent portions of the ring gear 106 along the external peripheral joint seam 160. This path overlaps at least the entire circumference of the low carbon steel band 104 and adjacent portions of the ring gear 106. During the fusion welding, the concentrated energy source is conveyed along a welding line, which overlaps the low carbon steel band 104 and the outer adjacent joining surface of the ring gear 106. This causes the low carbon steel band 104 to melt along with adjacent portions of ring gear 106 to produce a blended alloy molten weld pool that solidifies in the wake of the forward movement of the energy source.

The fusion welding of the ring gear 106 to the steel band 104 completes the manufacture of the differential case 102 and differential assembly 100. The weld joint is sufficient on its own to remediate the weldability challenges associated with the high carbon equivalency ferrous alloys such as the ones from which the ring gear 106 is constructed. The weld joint and the tabs 174 and apertures 170 of the steel band 104 joins the two component parts together and obviates the need to use mechanical fasteners to achieve the same result.

The concentrated energy source that is used to melt the low carbon steel band 104 and the adjacent portion of the ring gear 106 is preferably a laser beam, although other alternatives are certainly feasible including an electron beam. The laser beam may be a solid-state laser beam or a gas laser beam. Some notable solid-state lasers that may be used are a fiber laser, a disk laser, a direct diode laser, and a Nd:YAG laser, and a notable gas laser that may be used is a $CO_2$ laser, although other types of lasers may certainly be used. When using a laser beam as the concentrated energy source, foreign metal is preferably not introduced into the blended alloy weld pool via a filler wire or any other additive source apart from, of course, the low carbon steel band 104. In particular, nickel is not introduced into the blended alloy weld pool by concurrently melting a nickel filler wire with the laser beam and, as a result, nickel is excluded from the alloy composition of the weld bead. Nickel is not needed as a crack mitigating element within the blended alloy weld pool and the weld joint derived therefrom because the low carbon content of the low carbon steel band 104 can adequately neutralize crack susceptibility as discussed above.

The described method can make it feasible to laser-weld high strength ductile iron differential cases (such as D7003 and austempered ductile irons) to low carbon steel gears having high carbon equivalency ring gears 106 without using a filler metal. The features of the etched joining surface, extended tabs 174, and apertures 170 of the steel band 104 enable the steel band 104 and ductile iron to be bonded both metallurgically and mechanically. The feature of the low carbon steel of the steel band 104 enable the band 104 to be welded to the ring gear 106. This method relocates the laser welded joint traditionally between ductile iron and steel gear to the external peripheral joint seam 160 between the steel band 104 and ring gear 106. In addition, the method eliminates the need for high nickel filler wire and issues associated with using filler wire significantly enhance weld mechanical properties and reduces manufacturing complexity. Using this method in the joining of a differential case to a ring gear 106 reduces or eliminates the need of mechanical fasteners thus reducing material and weight of the differential assembly 100.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

We claim:

1. A method of joining two ferrous alloy component parts, comprising:

hot metal casting a portion of a first ferrous alloy component part onto a first joining surface of a low carbon intermediate element;

press fitting a joining surface of a second ferrous alloy component part against a second joining surface of the low carbon intermediate element; and fusion welding with a concentrated energy source the low carbon intermediate element to the second ferrous alloy component part; and wherein the first ferrous alloy component part is a differential case, wherein the second ferrous alloy component part is a ring gear, wherein the low carbon intermediate element is a steel sleeve including a plurality of die cut tabs, wherein the plurality of die cut tabs are bent inward along a respective folded edge, thereby defining a plurality of apertures extending between the first joining surface of the steel sleeve and the second joining surface of the steel sleeve, and wherein the hot metal casting the portion of the first ferrous alloy component part onto the first joining surface of the low carbon intermediate element includes flowing a molten ferrous alloy to encapsulate the plurality of die cut tabs and into the plurality of apertures, and then cooling the molten ferrous alloy until the molten ferrous alloy solidifies encapsulating the plurality of die cut tabs and filling the plurality of apertures, thereby mechanically locking the differential case to the steel sleeve.

2. The method of claim 1, wherein the first ferrous alloy component part comprises a carbon content of greater than 0.5 wt %.

3. The method of claim 2, wherein the second ferrous alloy component part comprises an equivalent carbon content of greater than 0.5 wt %.

4. The method of claim 3, wherein the low carbon intermediate element comprises from 0.15 wt % to 0.23 wt % carbon.

5. The method of claim 1, wherein the hot metal casting the portion of the first ferrous alloy component part onto the first joining surface of the low carbon intermediate element includes flowing a molten ferrous alloy onto a roughen surface defined on the first joining surface.

6. The method of claim 1, wherein the low carbon intermediate element includes an alloy composition of 0.15 wt % to 0.23 wt % carbon and iron.

7. A method of joining a differential case and a ring gear by using a steel sleeve as an intermediate element, comprising:

hot metal casting a portion of the differential case onto an inner surface of the steel sleeve;

press fitting a portion of the ring gear onto an outer surface of the steel sleeve; and fusion welding the ring gear onto the steel sleeve along a peripheral joint seam defined by adjacent portions the ring gear and the outer surface of the steel sleeve; and wherein the steel sleeve includes a plurality of die cut tabs bent inward along a respective folded edge, thereby defining a plurality of apertures extending between the inner surface and the outer surface of the steel sleeve, and wherein the hot metal casting the portion of the differential case onto the inner surface of the steel sleeve includes flowing a molten ferrous alloy to encapsulate the plurality of die cut tabs and filling the plurality of apertures, and then cooling the ferrous alloy until the ferrous alloy solidifies encapsulating the plurality of die cut tabs and filling the plurality of apertures, thereby mechanically locking the differential case to the steel sleeve.

8. The method of claim 7, wherein:

the inner surface of the steel sleeve includes a textured surface, and hot metal casting a portion of the differential case onto an inner surface of the steel sleeve further includes flowing the molten ferrous alloy onto the textured surface and then cooling the ferrous alloy until the ferrous alloy solidifies.

9. The method of claim 8, wherein the steel sleeve includes an alloy composition of 0.15 wt % to 0.23 wt % carbon and iron.

10. A differential assembly comprising:

a differential case cast from a carbon ferrous alloy having greater than 0.5 wt % carbon;

a ring gear is constructed from a carbon ferrous alloy having less than 0.5 wt % carbon; and a steel sleeve having an alloy composition of from 0.15 wt % to 0.23 wt % and iron, wherein the steel sleeve includes a plurality of die cut tabs, wherein the plurality of die cut tabs are bent inward along a respective folded edge, thereby defining a plurality of apertures extending between an inner surface and an outer surface of the steel sleeve; and wherein a portion of the differential case cast onto the inner surface of the steel sleeve to encapsulate the plurality of die cut tabs and fill in the plurality of apertures, thereby mechanically locking the steel sleeve to the differential case; and wherein a portion of the ring gear is fusion welded onto the outer surface of the steel sleeve.

* * * * *